(12) United States Patent
Tsumura et al.

(10) Patent No.: US 10,774,991 B1
(45) Date of Patent: Sep. 15, 2020

(54) GAS FILLING APPARATUS

(71) Applicant: Tatsuno Corporation, Tokyo (JP)

(72) Inventors: Yasuyuki Tsumura, Tokyo (JP); Atsushi Takase, Tokyo (JP); Kiyoshi Kimura, Tokyo (JP); Takayuki Fuse, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 183 days.

(21) Appl. No.: 16/303,802

(22) PCT Filed: Jun. 20, 2016

(86) PCT No.: PCT/JP2016/068242
§ 371 (c)(1),
(2) Date: Nov. 21, 2018

(87) PCT Pub. No.: WO2017/203721
PCT Pub. Date: Nov. 30, 2017

(30) Foreign Application Priority Data

May 24, 2016 (JP) .................................. 2016-103128

(51) Int. Cl.
*F17C 5/00* (2006.01)
*F17C 13/02* (2006.01)
*B67D 7/04* (2010.01)

(52) U.S. Cl.
CPC .............. *F17C 5/007* (2013.01); *F17C 13/02* (2013.01); *B67D 2007/0403* (2013.01);
(Continued)

(58) Field of Classification Search
CPC .... F17C 5/007; F17C 13/02; F17C 2221/012; F17C 2250/0443; F17C 2205/0352;
(Continued)

(56) References Cited

U.S. PATENT DOCUMENTS

| | | | | |
|---|---|---|---|---|
| 3,603,480 A | * | 9/1971 | Irie | B67D 7/38 222/20 |
| 4,331,190 A | * | 5/1982 | Sutcliffe | B67D 7/42 141/392 |

(Continued)

*Primary Examiner* — Timothy L Maust
(74) *Attorney, Agent, or Firm* — Stetina Brunda Garred and Brucker; Mark B. Garred

(57) ABSTRACT

A gas filling apparatus having a filling nozzle with high operability. A gas filling apparatus 1, comprising; a filling mechanism for transporting a gas from a gas supply source via a gas transporting pipe while measuring flow rate of the gas; a filling hose 3 connected to the gas transporting pipe, the filling hose having a filling nozzle 4 at an end; a nozzle hook 5 on which the filling nozzle is hung; and a guide mechanism 7 for guiding the filling nozzle from the nozzle hook to a predetermined position when the filling nozzle is detached from the nozzle hook. The guide mechanism can guide the filling nozzle to a filling port of a fuel tank mounted on a vehicle, which allows the filling nozzle to move to the filling port of the fuel tank with ease even though the filling nozzle is heavy or a high pressure gas such as hydrogen gas is handled. The nozzle hook can include an injection port 5d for injecting a dry gas to the filling nozzle hung on the nozzle hook.

6 Claims, 7 Drawing Sheets

(a)

(b)

(52) U.S. Cl.
CPC ........... *B67D 2007/0419* (2013.01); *B67D 2007/0421* (2013.01); *B67D 2007/0423* (2013.01); *B67D 2007/0474* (2013.01); *F17C 2205/0352* (2013.01); *F17C 2221/012* (2013.01); *F17C 2250/0443* (2013.01)

(58) Field of Classification Search
CPC .... B67D 2007/0403; B67D 2007/0419; B67D 2007/0421; B67D 2007/0423; B67D 2007/0474
See application file for complete search history.

(56) References Cited

U.S. PATENT DOCUMENTS

| | | | | |
|---|---|---|---|---|
| 4,883,229 | A * | 11/1989 | Moeller | B67D 7/002 239/587.2 |
| 5,110,010 | A * | 5/1992 | Smith | B67D 7/12 141/392 |
| 7,082,969 | B1 * | 8/2006 | Hollerback | B67D 7/04 141/38 |
| 8,393,362 | B1 * | 3/2013 | Hollerback | B25J 11/00 141/94 |
| 2012/0018446 | A1 * | 1/2012 | Tague | B67D 7/32 222/25 |
| 2014/0261867 | A1 * | 9/2014 | Lambrix | F17C 5/02 141/4 |
| 2014/0261882 | A1 * | 9/2014 | Lambrix | B67D 7/04 141/94 |
| 2016/0146402 | A1 * | 5/2016 | Wyper | F17C 5/06 141/4 |
| 2017/0009939 | A1 * | 1/2017 | Takahashi | F17C 5/02 |
| 2018/0375536 | A1 * | 12/2018 | Emori | B60L 53/18 |

* cited by examiner

GAS FILLING APPARATUS

CROSS-REFERENCE TO RELATED APPLICATIONS

The present application claims priority to International Application No. PCT/JP2016/068242 filed Jun. 20, 2016 and Japanese Patent Application No. 2016-103128 filed May 24, 2016, the disclosures of which is incorporated herein by reference.

STATEMENT RE: FEDERALLY SPONSORED RESEARCH/DEVELOPMENT

Not Applicable

BACKGROUND

1. Technical Field

The present invention relates to a gas filling apparatus for filling a gas into a fuel tank mounted on vehicles such as CNG vehicles, fuel-cell-powered vehicles and hydrogen vehicles that use CNG, hydrogen gas and so on for fuel.

2. Description of the Related Art

As vehicles coping with recent environmental problems, developments regarding CNG vehicles, fuel-cell-powered vehicles, hydrogen vehicles and the like that use gas fuel such as CNG (Compressed Natural Gas) and hydrogen gas are actively advanced. In order to promote spread of the vehicles traveling with the gas fuel, it becomes necessary to use an apparatus for stably and efficiently filling the gas fuel to an in-vehicle tank. Then, in Patent document 1 for instance is proposed a gas filling apparatus for efficiently filling the gas fuel to the in-vehicle tank.

PATENT DOCUMENT 1: Japanese Patent Publication 2014-109350 gazette

BRIEF SUMMARY

However, general gas filling apparatuses are heavy to improve pressure resistances of the filling nozzle and the filling hose, and the weight of the apparatuses becomes greater when high pressure is applied to the filling nozzle and the filling hose, so that load on users of the filling nozzle is large, and it is not easy to guide the filling nozzle to a filling port of an in-vehicle fuel tank and to fit a gas supply port of the filling nozzle to the filling port of the fuel tank. In addition, when the user accidentally drops the filling nozzle or collides it to a vehicle, it cannot be denied that the filling nozzle or the vehicle may be damaged.

Further, in recent years, in order to promote hydrogen stations, use of self-type gas filling apparatuses has been considered through amendments of ministerial ordinance and security regulation, and it is desired to develop a gas filling apparatus capable of filling gas easily even if users are not used to using the filling nozzle.

Then, the present invention has been made in consideration of the above problems in the conventional technique, and the object of the present invention is to provide a gas filling apparatus having a filling nozzle with high operability.

In order to attain the above object, a gas filling apparatus of the present invention includes; a filling mechanism for transporting a gas from a gas supply source via a gas transporting pipe while measuring flow rate of the gas; a filling hose connected to the gas transporting pipe, the filling hose having a filling nozzle at an end; a nozzle hook on which the filling nozzle is hung; and a guide mechanism for guiding the filling nozzle from the nozzle hook to a predetermined position when the filling nozzle is detached from the nozzle hook.

With the present invention, when the filling nozzle is detached from the nozzle hook, the guide mechanism can guide the filling nozzle to a filling port of a fuel tank mounted on a vehicle, which allows the filling nozzle to move to the filling port of the fuel tank with ease even though the filling nozzle is heavy or a high pressure gas such as hydrogen gas is handled, resulting in improved operability of the filling nozzle. In addition, fall of the filling nozzle can be prevented.

In the above gas filling apparatus, the guide mechanism may include a plurality of links, one of which is connected to the filling nozzle, and joints for connecting a pair of adjacent links of the plurality of links so as to be rotatable with each other, when the filling nozzle is hung on the nozzle hook, the plurality of links is folded via the joints, and when the filling nozzle is detached from the nozzle hook, the plurality of links extends to guide the filling nozzle from the nozzle hook to the predetermined position.

In addition, the guide mechanism can include a wire connected to the filling nozzle, and a constant load spring for winding up the wire with a constant force, the wire being hung down from the nozzle hook on the predetermined position side, and when the filling nozzle is detached from the nozzle hook, the wire moves through gravity so as to guide the filling nozzle from the nozzle hook to the predetermined position. The guide mechanism can further include a detaching mechanism for releasing the connection between the wire and the filling nozzle when the filling nozzle is pulled with a force larger than a predetermined strength, and a speed reduction unit for preventing the wire from rapidly being wound by the constant load spring when connection between the wire and the filling nozzle are released by the detaching mechanism.

It is possible to mount a case for accommodating the filling nozzle hung on the nozzle hook, wherein a door of the case includes a pressing member for pressing the filling nozzle hung on the nozzle hook in a direction that the door is closed.

Further, in the above gas filling apparatus, the nozzle hook may include an injection port for injecting a dry gas to the filling nozzle hung on the nozzle hook. With this, a gas supply port can easily be connected to the filling port of the fuel tank mounted on a vehicle.

As described above, with the present invention, it becomes possible to provide a gas filling apparatus having a filling nozzle with high operability.

DETAILED DESCRIPTION

Next, embodiments of the present invention will be explained with referenced to the drawings in detail. In the below explanation, the gas filling apparatus of the present invention is a hydrogen gas filling apparatus as an example, and with the apparatus, to a hydrogen gas vehicle is fed a hydrogen gas.

Figure 1:
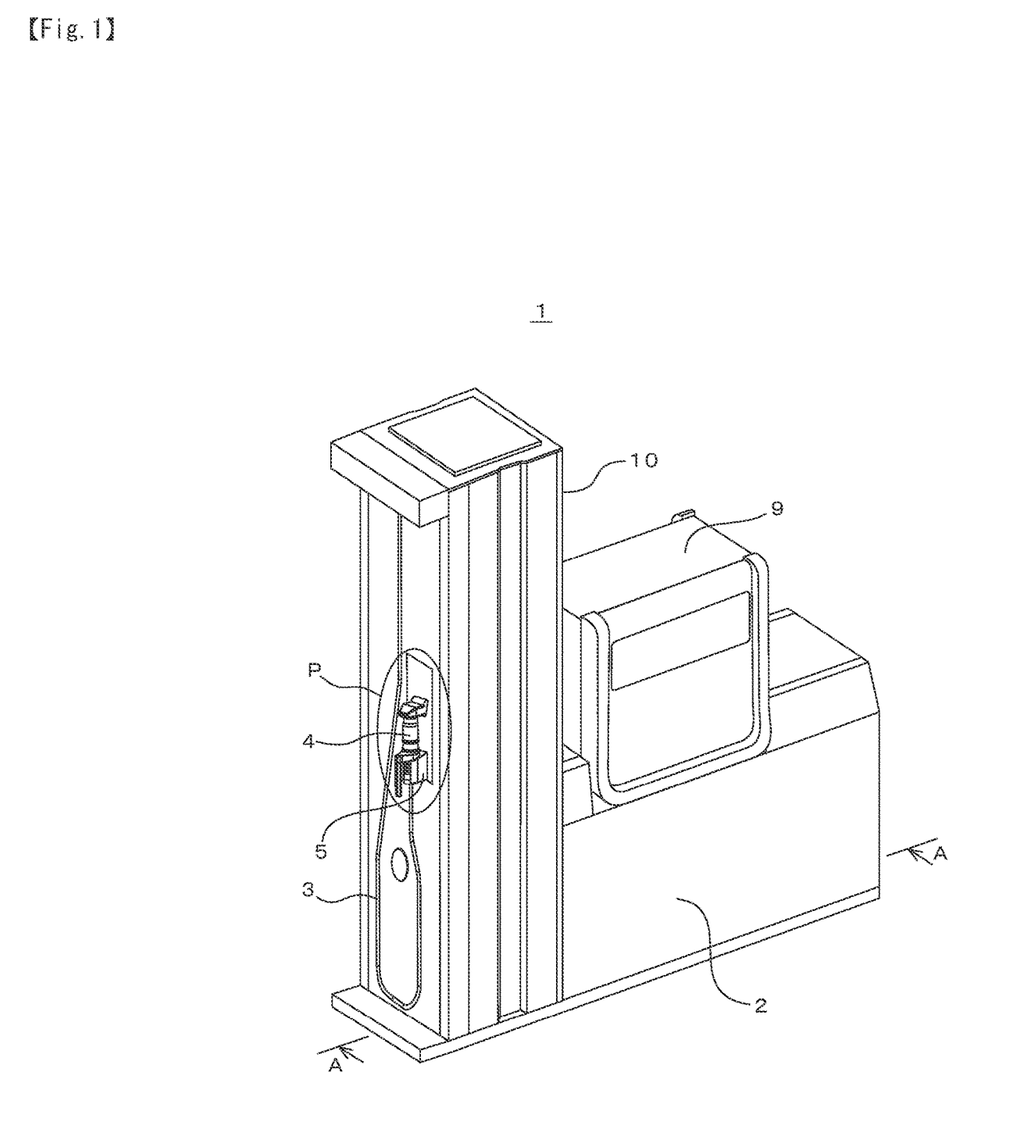
FIG. 1 is an entire constitution view of a gas filling apparatus according to an embodiment of the present invention.

FIG. 1 shows a gas filling apparatus according to an embodiment of the present invention, and the gas filling apparatus 1 includes, in a housing main body 2, a filling mechanism for transporting a hydrogen gas from a gas supply source via a gas transporting pipe while measuring flow rate of the gas, and a filling hose 3 is connected to the gas transporting pipe. To an end of the filling hose 3 is attached a filling nozzle 4, and on a side surface of a housing 10 on the left side of the housing main body 2 is mounted a nozzle hook 5 on which the filling nozzle 4 is hung. On the housing main body 2 is mounted a display 9 for displaying filling amount of hydrogen gas and others.

Figure 2:
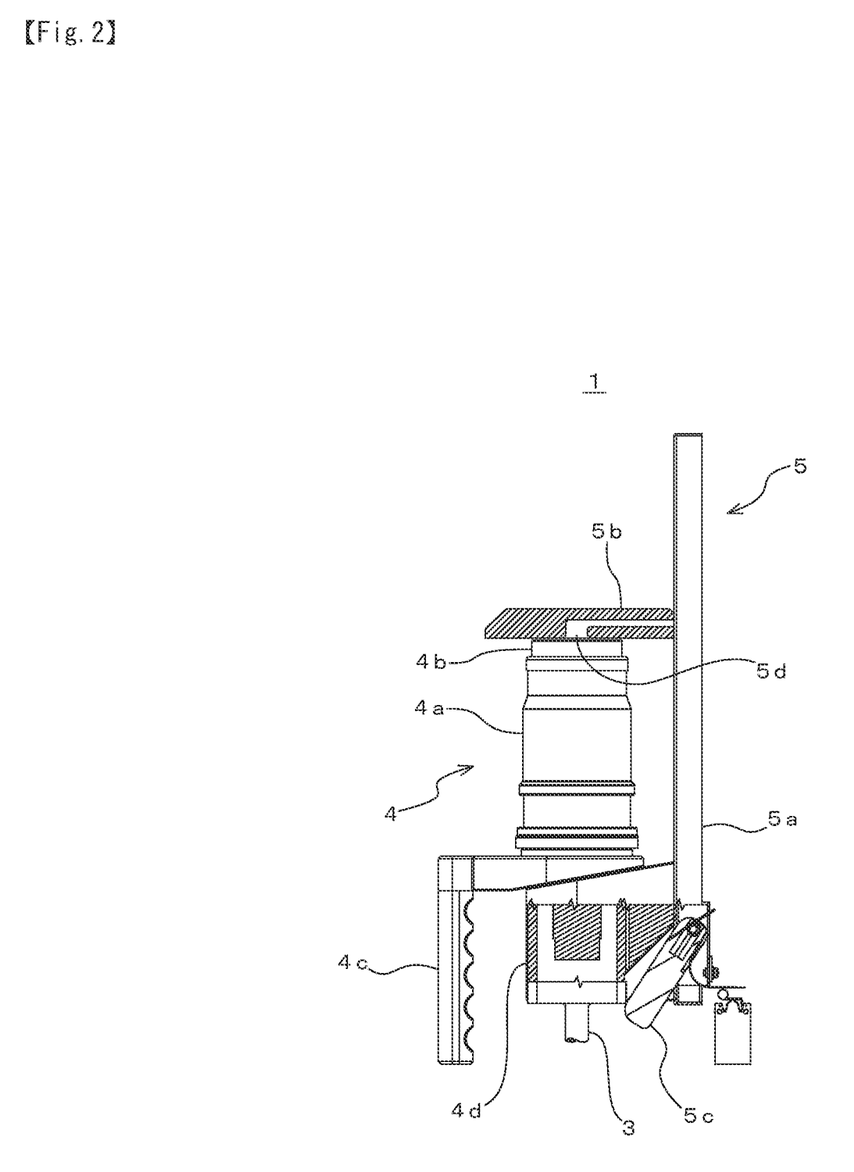
FIG. 2 is a partially enlarged sectional view of the P part shown in FIG. 1.

As shown in FIG. 2, the filling nozzle 4 is provided with a base 4a, a gas supply port 4b for supplying hydrogen gas, a handle portion 4c for grasping the filling nozzle 4, and a connection portion 4d to which the filling hose 3 is connected.

The nozzle hook 5 is provided with a base 5a, an injection portion 5b with an injection port 5d for injecting a dry gas to the gas supply port 4b of the filling nozzle 4 in a nonuse state and a nozzle switch (hereinafter, abbreviated as "nozzle SW") 5c for detecting hang ON/OFF of the filling nozzle 4 on the nozzle hook 5. The nozzle SW 5c turns OFF when the filling nozzle 4 is hung on the nozzle hook 5, and turns ON when the filling nozzle 4 is detached from the nozzle hook 5. As the dry gas can be used inert gases such as nitrogen, argon and helium, carbonic dioxide and air.

Figure 3:
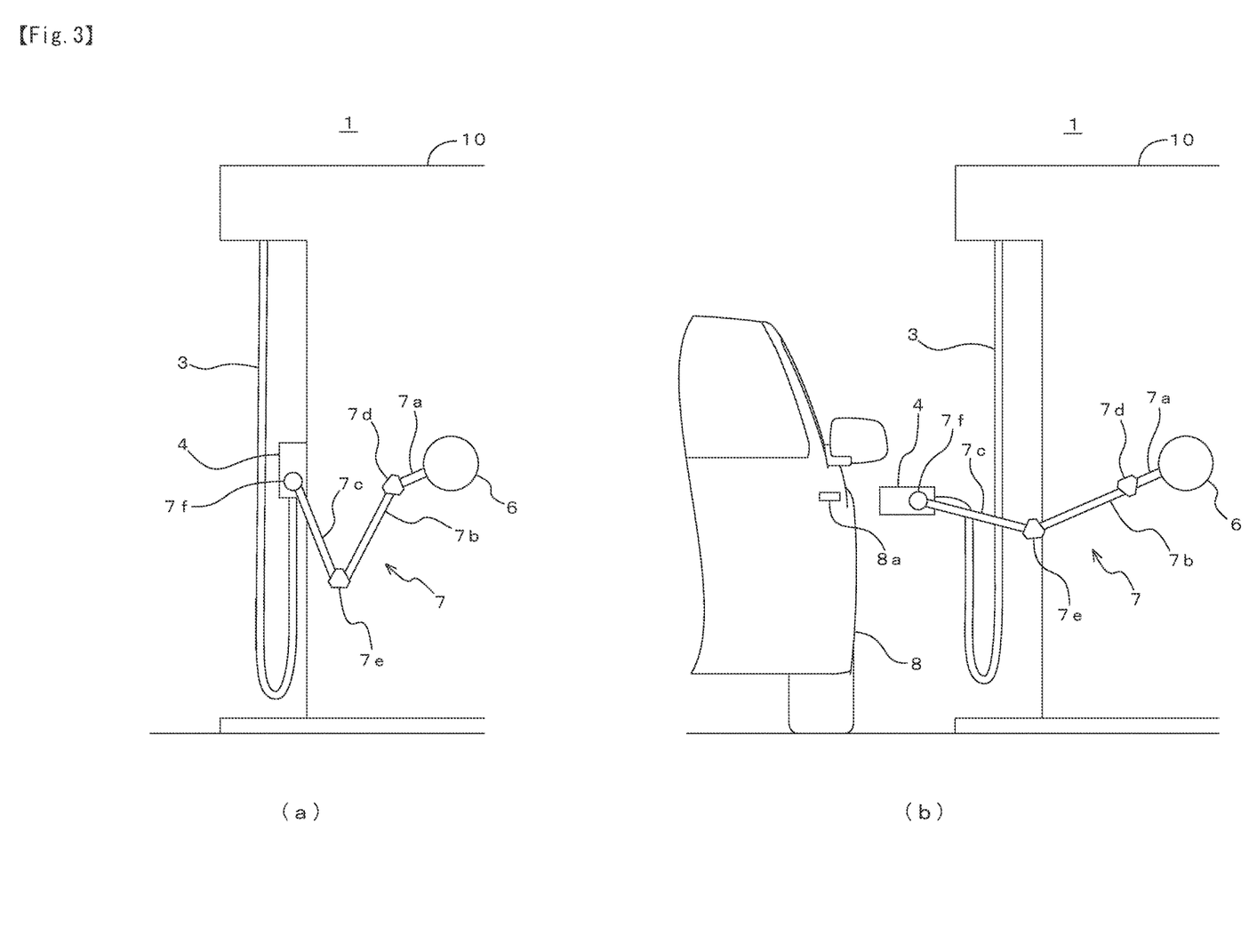
FIG. 3 is a line schematic sectional views of the gas filling apparatus shown in FIG. 1, in which (a) shows a condition that a filling nozzle is not used, and (b) shows a condition that a filling nozzle is used.

As roughly shown in FIG. 3, in the housing 10 of the gas filling apparatus 1 are mounted supporting means 6 and a guide mechanism 7. The guide mechanism 7 is provided with links 7a to 7c, joints 7d, 7e for connecting the links 7a to 7c and a joint 7f for rotatably connecting the link 7c and the filling nozzle 4 with each other, and an end of the link 7a is movably or rotatably supported by the supporting means 6. The supporting means 6 is fixed on the housing 10 side.

The supporting means 6 and the guide mechanism 7 are those generally used as described in Japanese Patent Publication 2006-282300 gazette. Therefore, details of the mechanisms are omitted. When a user moves the filling nozzle 4 hung on the nozzle hook (refer to FIG. 3(a)) to a filling port 8a (refer to FIG. 3(b)), the links 7a to 7c and others separately move, and the supporting means 6 movably or rotatably supports an end of the link 7a, which allows the filling nozzle 4 to be guided to the filling port 8a of a fuel tank. In the same manner, from the condition shown in FIG. 3(b) to the condition shown in FIG. 3(a) can be returned the filling nozzle 4. Constructions of the supporting means 6 and the guide mechanism 7 can be properly determined depending on a location on which the filling apparatus 1 is installed and a size thereof.

Next, motion of the gas filling apparatus with the above construction will be explained with reference to FIGS. 1 to 4.

Figure 4:
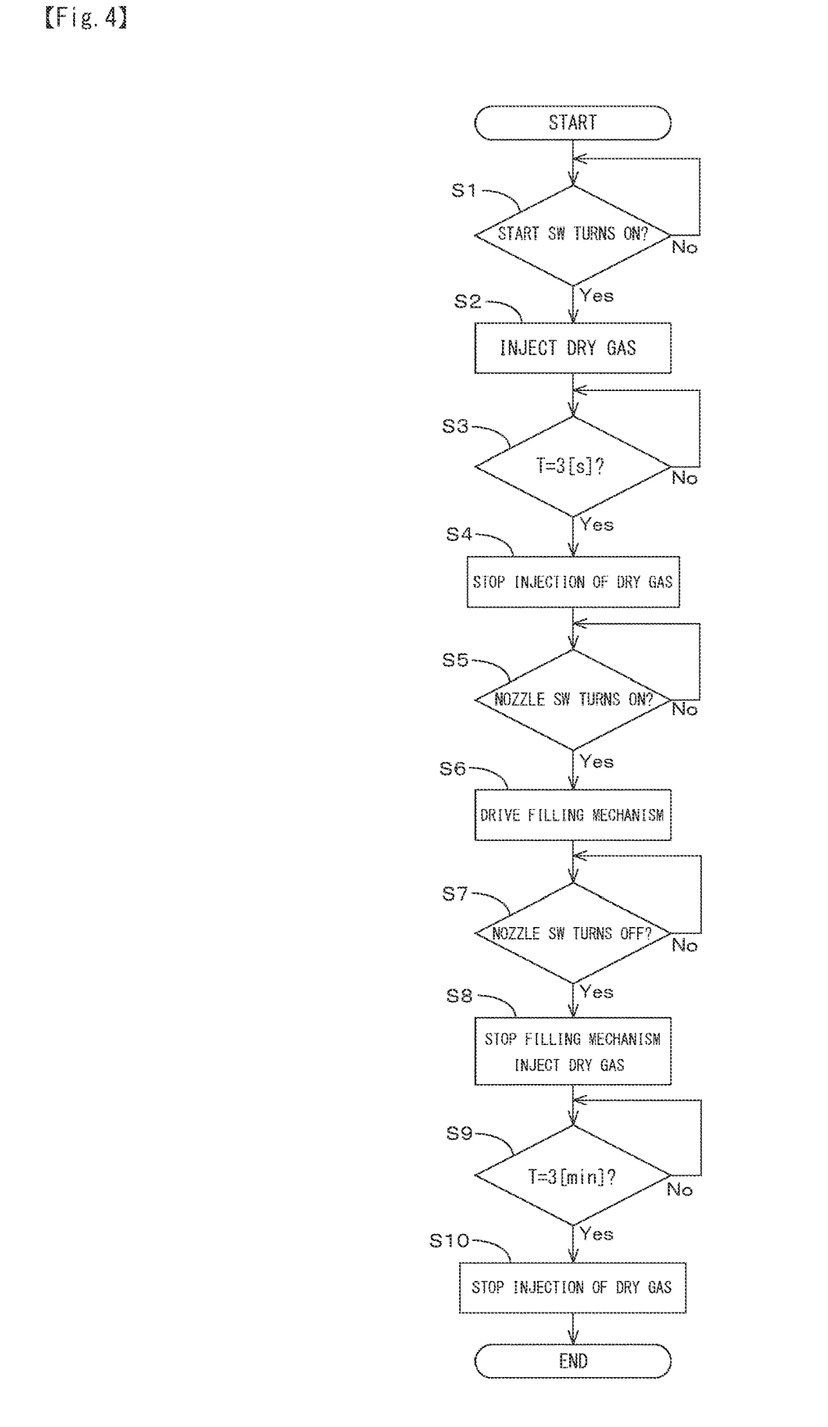
FIG. 4 is a flowchart for explaining a motion of the gas filling apparatus shown in FIG. 1.

In step S1, it is judged whether a user of the gas filling apparatus 1 presses a start switch (not shown, hereinafter abbreviated as "start SW") or not. When the start SW turns ON (step S1; Yes), a dry gas is injected from the injection port 5d of the injecting portion 5b of the nozzle hook 5 to the gas supply port 4b of the filling nozzle 4 (in step S2).

In step S3, it is judged whether a dry gas injecting time T reaches 3 seconds or not. When the dry gas injecting time T reaches 3 seconds (step S3; Yes), the injection of the dry gas is stopped (in step S4). With this, a frozen object adhering to the gas supply port 4b of the filling nozzle 4 is removed, and the filling nozzle becomes a condition capable of performing safe filling.

When a user detaches the filling nozzle 4 from the nozzle hook 5, the nozzle SW 5c turns ON (step S5; Yes), which allows the detached filling nozzle 4 to be connected to the filling port 8a of the fuel tank mounted to a vehicle 8 while utilizing guide by the guide mechanism 7. After the filling nozzle 4 is connected, the filling mechanism drives (in step S6), and a hydrogen gas from the gas supply source is transported via the gas transporting pipe and the filling hose 3 to the filling nozzle 4 to perform filling to the fuel tank. In addition, when it is judged that the nozzle SW 5c does not turn ON in step S5 (step S5; No), the system waits until the nozzle SW turns ON.

After the hydrogen gas is filled, the user utilizes the guide mechanism 7 to return the filling nozzle 4 to the nozzle hook 5. With this, the nozzle SW turns OFF (step S7; Yes), the filling mechanism stops, and the dry gas is injected to the filling nozzle 4 in the same manner as the step S2 described above (in step S8). In addition, when it is judged that the nozzle SW 5c does not turn OFF in step S7 (step S7; No), the system waits until the nozzle SW 5c turns OFF.

The injection of the dry gas in step S8 is controlled to be stopped after three minute (step S9; Yes) (step S10).

As described above, with the present embodiment, adding the guide mechanism 7 to the filling nozzle 4 allows movement of the filling nozzle 4 between the nozzle hook 5 and the fuel tank filling port 8a of the vehicle 8 to become easy, and operability of the filling nozzle 4 can be improved. In addition, drop of the filling nozzle 4 can be prevented.

In addition, mounting a temperature sensor on the nozzle hook 5 and controlling the injection of the dry gas from the injection port 5d of the injecting portion 5b of the nozzle hook 5 enable a freezing on the gas supply port 4b in a nonuse state (waiting state) of the filling apparatus 1 to melt. Further, mounting an explosion proof type heater to the nozzle hook 5 and controlling the heater based on an output from the temperature sensor enable the freezing to melt.

Figure 5:
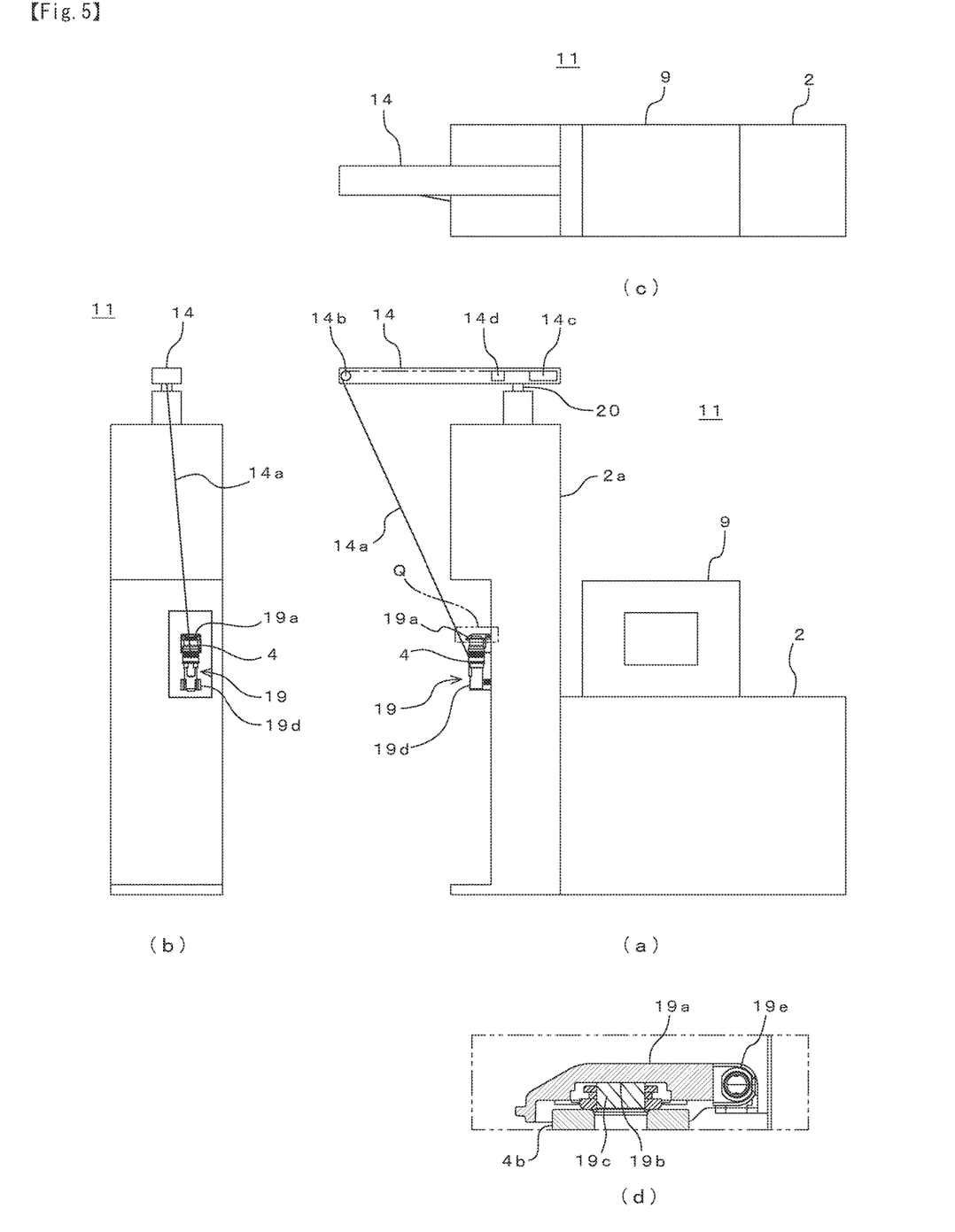
FIG. 5 is a view showing a gas filling apparatus according to another embodiment of the present invention, in which (a) is a front view, (b) is a left side view, (c) is a top view and (d) is a partially enlarged sectional view of the Q part shown in (a) during business hours.
Figure 6:
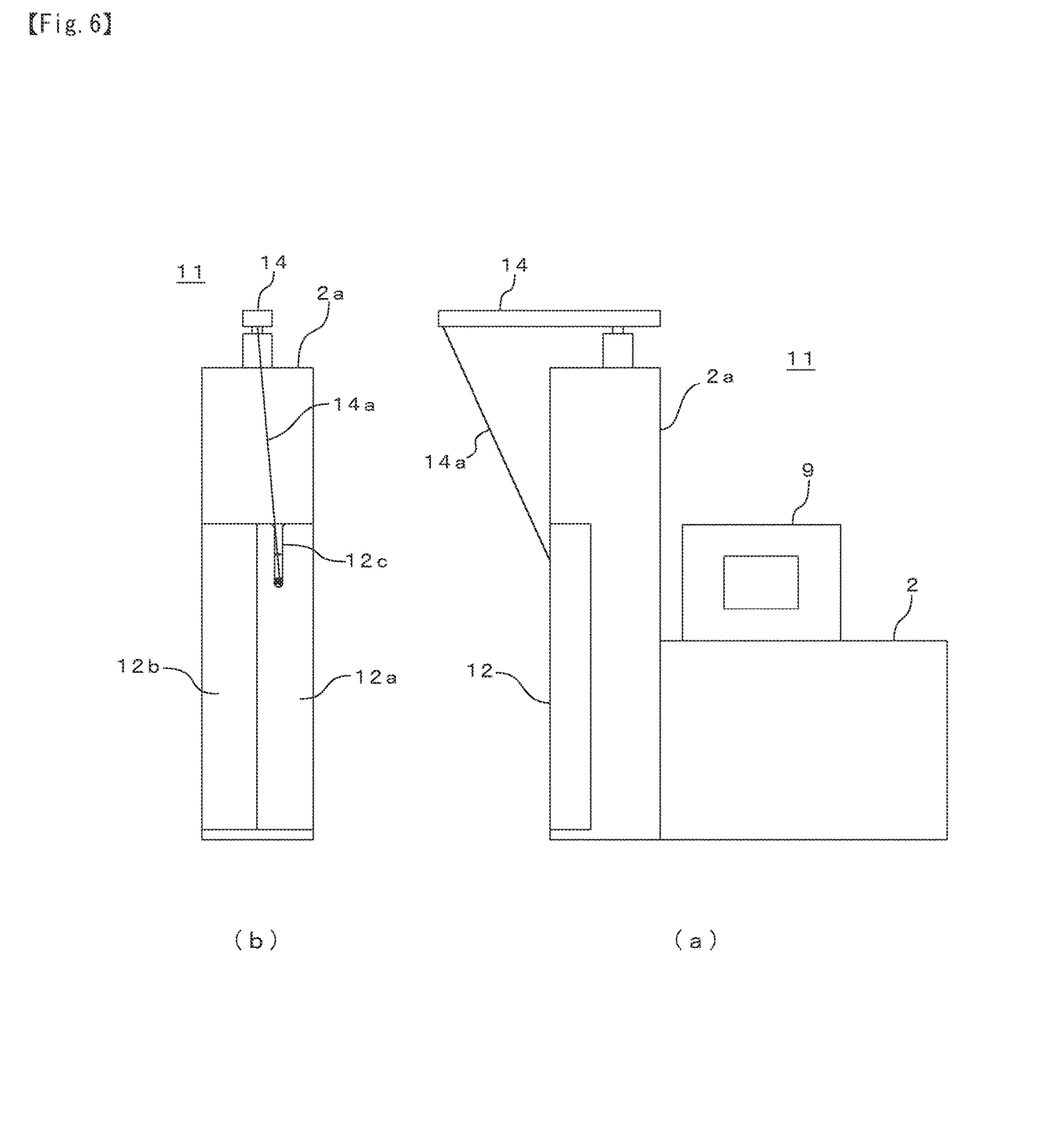
FIG. 6 is a view showing a gas filling apparatus according to another embodiment of the present invention, in which (a) is a front view and (b) is a left side view during off-business hours.

FIGS. 5 and 6 show a gas filling apparatus according to another embodiment of the present invention, and the gas filling apparatus 11 includes, in addition to the construction of the gas filling apparatus 1 shown in FIG. 1, as shown in FIG. 6, includes a case 12 for accommodating the filling nozzle 4 and others when a gas station on which the filling apparatus 11 is installed is in non-business hours, an arm 14 for upwardly pulling the filling nozzle 4 via a wire 14a in a top portion of a hose unit 2a instead of the supporting means 6 and the guide mechanism 7, and further a nozzle hook 19 instead of the nozzle hook 5. In addition, instead of the housing 10 is mounted the hose unit 2a. To the same components of the gas filling apparatus 11 as those of the gas filling apparatus 1 shown in FIG. 1 are attached the same numeral numbers as those of the filling apparatus 1, and explanations thereabout are omitted.

Figure 7:
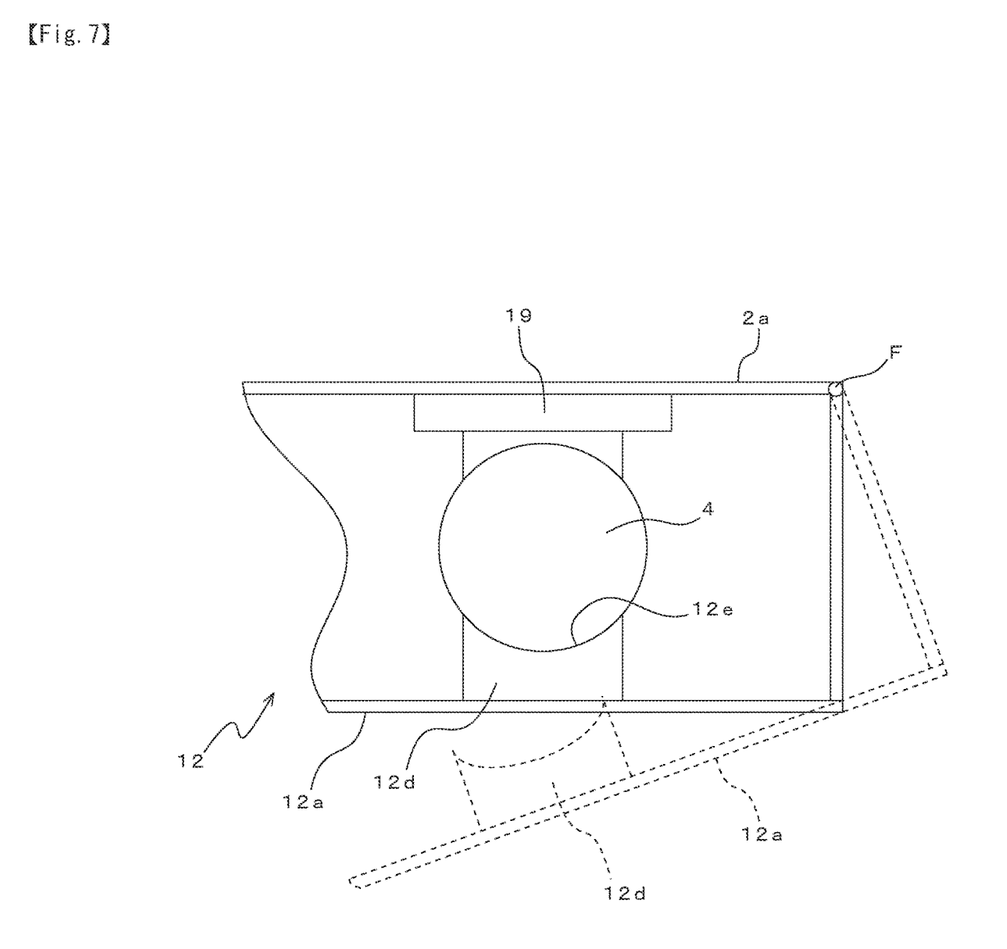
FIG. 7 is a schematic sectional view showing a filling nozzle, a door and the like shown in FIG. 6.

The case 12 includes, as shown in FIG. 7 also, a portion of the hose unit 2a and L-shaped doors 12a, 12b when seen from a top, and the doors 12a, 12b are rotatable about a fulcrum F (of the door 12a only is shown in FIG. 7). On the door 12a is formed a slit 12c through which the wire 14a connected to the filling nozzle 4 passes to close the door 12a under a condition that the filling nozzle 4 is accommodated in the case 12.

On the door 12a of the case 12 on the filling nozzle 4 side is, as shown in FIG. 7, mounted a pressing member 12d for pressing the filling nozzle 4 with the surface 12e formed along the outline of the filing nozzle 4, the pressing member 12d being formed in a board shape or a pillar shape. With this, unless the filling nozzle 4 is properly hung on the nozzle hook 19 described below, the door 12a cannot be closed.

The arm 14 is rotatably attached around an axis 20 extending from a top portion of the hose unit 2a in a vertical direction, and the arm 14 is provided with a wire 14a connected to the filling nozzle 4 while being supported by a sheave 14b, a constant load spring 14c for winding up the wire 14a with a constant force, and a speed reduction unit 14d for preventing the wire 14a from being rapidly wound.

The wire 14a is connected via a detaching mechanism not shown to the filling nozzle 4, and the connection between the wire 14a and the filling nozzle 4 is released when the filling nozzle 4 is pulled with a force larger than a predetermined strength.

The speed reduction unit 14d is mounted to prevent winding speed of the wire 14a from accelerating due to no gravity of the filling nozzle 4 acting to the constant load spring 14c when the connection between the wire 14a and the filling nozzle 4 is released by the detaching mechanism. For example, as the speed reduction unit 14d is used a mechanism like a rotary damper for not resisting movement of the wire 14a in a direction that the wire 14a is pulled, and for resisting movement of the wire 14a in a direction that the wire 14a is wound up through oil to decrease the speed of the wire 14a.

Returning to FIG. 5, the nozzle hook 19 has, in addition to the base 5a shown in FIG. 2, an upper lid 19a having a concave portion 19b, enlarged in FIG. 5(d), for accommodating a portion of the gas supply port 4b of the filling nozzle 4, and a convex portion 19c made of elastic body mounted on the concave portion 19b and being inserted in the gas supply port 4b, an engaging member 19d for engagingly locking a lower portion of the filling nozzle 4, and a rotating member 19e for rotating the upper lid 19a substantially 90 degree such that the upper lid 19a becomes vertical from the condition shown in FIG. 5(d). With this construction, the upper portion and the lower portion of the filling nozzle 4 are supported, so that a gravity center of the filling nozzle 4 supported by the nozzle hook 19 is stabilized.

With the gas filling apparatus 11 having the above construction, since the sheave 14b positions on the vehicle side from the nozzle hook 19 (left side in FIG. 5 (a)), when a user detaches the filling nozzle 4 from the nozzle hook 19, the filling nozzle 4 is guided by its own weight on the vehicle side. With this, in the same manner as the above gas filling apparatus 1, it becomes easy that the filling nozzle 4 moves between the nozzle hook 19 and the filling port of the in-vehicle fuel tank, and operability of the filling nozzle 4 can be improved. In addition, falling of the filling nozzle 4 can be prevented.

Further, even if a user takes off the filling nozzle 4 under a condition that the user pulls the filling nozzle 4, that is the wire 14a of the arm 14 is pulled, the wire 14a does not roll up rapidly by the speed reduction unit 14d, so that the gas filling apparatus 11 is excellent in safety.

In addition, in the two embodiment are explained cases that hydrogen gas is filled to the vehicle 8, but other gases can be filled.

DESCRIPTION OF THE REFERENCE NUMERALS 1 gas filling apparatus
2 housing main body
2a hose unit
3 filling hose
4 filling nozzle
4a base
4b gas supply port
4c handle portion
4d connection portion
5 nozzle hook
5a base
5b injecting portion
5c nozzle SW
5d injection port
6 supporting means
7 guide mechanism
7a to 7c links
7d to 7f joints
8 vehicle
8a filling port
9 display
10 housing
11 gas filling apparatus
12 case
12a, 12b doors
12c slit
12d pressing member
12e surface
14 arm
14a wire
14b sheave
14c constant load spring
14d speed reduction unit
19 nozzle hook
19a upper lid
19b concave portion
19c convex portion
19d engaging member
19e rotating means
20 axis

The invention claimed is:
1. A gas filling apparatus comprising;
a filling mechanism for transporting a gas from a gas supply source via a gas transporting pipe while measuring flow rate of the gas;
a filling hose connected to the gas transporting pipe, the filling hose having a filling nozzle at an end;
a nozzle hook on which the filling nozzle is hung;
a guide mechanism for guiding the filling nozzle from the nozzle hook to a predetermined position when the filling nozzle is detached from the nozzle hook; and a case for accommodating the filling nozzle hung on the nozzle hook, wherein a door of the case includes a pressing member for pressing the filling nozzle hung on the nozzle hook in a direction that the door is closed.

2. The gas filling apparatus as claimed in claim 1, wherein the guide mechanism comprises a plurality of links, one of which is connected to the filling nozzle, and joints for connecting a pair of adjacent links of the plurality of links so as to be rotatable with each other, when the filling nozzle is hung on the nozzle hook, the plurality of links is folded via the joints, and when the filling nozzle is detached from the nozzle hook, the plurality of links extends to guide the filling nozzle from the nozzle hook to the predetermined position.

3. The gas filling apparatus as claimed in claim 1, wherein the guide mechanism comprising a wire connected to the filling nozzle, and a constant load spring for winding up the wire with a constant force, the wire is hung down from the nozzle hook on the predetermined position side, and when the filling nozzle is detached from the nozzle hook, the wire moves through gravity so as to guide the filling nozzle from the nozzle hook to the predetermined position, further comprising a detaching mechanism for releasing the connection between the wire and the filling nozzle when the filling nozzle is pulled with a force larger than a predetermined strength, and a speed reduction unit for preventing the wire from rapidly being wound by the constant load spring when connection between the wire and the filling nozzle are released by the detaching mechanism.

4. The gas filling apparatus as claimed in claim 1, wherein the nozzle hook includes an injection port for injecting a dry gas to the filling nozzle hung on the nozzle hook.

5. The gas filling apparatus as claimed in claim 2, wherein the nozzle hook includes an injection port for injecting a dry gas to the filling nozzle hung on the nozzle hook.

6. The gas filling apparatus as claimed in claim 3, wherein the nozzle hook includes an injection port for injecting a dry gas to the filling nozzle hung on the nozzle hook.

\* \* \* \* \*